United States Patent
Soliman

(10) Patent No.: US 8,062,171 B2
(45) Date of Patent: Nov. 22, 2011

(54) TRANSMISSION ENGAGEMENT CONTROL DURING AN ENGINE RESTART OF A HYBRID ELECTRIC VEHICLE

(75) Inventor: Ihab S. Soliman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 459 days.

(21) Appl. No.: 12/434,114

(22) Filed: May 1, 2009

(65) Prior Publication Data

US 2010/0279816 A1 Nov. 4, 2010

(51) Int. Cl.
*B60K 1/02* (2006.01)
(52) U.S. Cl. .......................................... 477/3
(58) Field of Classification Search ......... 477/3; 74/661
See application file for complete search history.

(56) References Cited

U.S. PATENT DOCUMENTS

| 6,709,362 B2* | 3/2004 | Tomohiro et al. ................. 477/3 |
| 6,913,558 B2* | 7/2005 | Mori et al. ......................... 477/3 |
| 7,056,260 B2* | 6/2006 | Nakamori et al. ................. 477/3 |
| 7,972,239 B2* | 7/2011 | Imediegwu ......................... 477/2 |
| 2005/0124457 A1* | 6/2005 | Nakamori et al. ................. 477/3 |
| 2009/0017984 A1* | 1/2009 | Shibata et al. .................... 477/3 |
| 2010/0279818 A1* | 11/2010 | Soliman et al. .................... 477/5 |
| 2010/0304926 A1* | 12/2010 | Soliman et al. ................. 477/38 |
| 2011/0065548 A1* | 3/2011 | Yu et al. ........................ 477/203 |
| 2011/0070999 A1* | 3/2011 | Soliman et al. .................... 477/3 |

* cited by examiner

*Primary Examiner* — Dirk Wright
(74) *Attorney, Agent, or Firm* — David B. Kelley; MacMillan, Sobanski & Todd, LLC

(57) ABSTRACT

A method for controlling transmission engagement during restart of an engine in a hybrid electric powertrain includes moving a gear lever between a forward position and reverse position, using electric power to drive an auxiliary pump whose output causes a transmission to engage a gear that corresponds to the lever position and to stroke, to zero torque capacity, an oncoming clutch that corresponds to said gear, initiating the restart, and discontinuing use of the auxiliary pump.

21 Claims, 7 Drawing Sheets

TRANSMISSION ENGAGEMENT CONTROL DURING AN ENGINE RESTART OF A HYBRID ELECTRIC VEHICLE

BACKGROUND OF THE INVENTION

1. Field of the Invention

This invention relates generally to a powertrain for a hybrid electric vehicle (HEV) and, more particularly, to control of a transmission that switches from drive-to-reverse or reverse-to-drive preparatory to an engine restart event.

2. Description of the Prior Art

A hybrid electric vehicle (HEV) is a vehicle configured with a hybrid propulsion system that utilizes at least two different sources of torque for propelling the vehicle. As one non-limiting example, a hybrid propulsion system may combine a conventional propulsion system that includes an internal combustion engine and a stepped-ratio automatic transmission with an electric propulsion system that includes one or more electric motors and a rechargeable energy storage device, such as a battery, that can power the electric motors or store energy to improve fuel economy over the conventional vehicle. A hybrid electric vehicle typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor.

Motor vehicles can be designed to employ certain aspects of hybrid electric technology to reduce fuel consumption, but without use of a hybrid drivetrain. In such vehicles, called "micro-HEVs", shutting down the engine during conditions where the engine operates at idle speed will be used to reduce fuel consumption and reduce emissions in a conventional powertrain that includes an internal combustion engine and a stepped-ratio automatic transmission, but no electric machine for driving the wheels. The primary condition that is checked by the micro-HEV powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

In a micro-HEV application using an internal combustion engine with an enhanced starter motor for engine start/stop and a dual-clutch (DCT) automatic transmission, as shown in FIGS. 1 and 2, it is important to provide vehicle propulsion upon an engine restart in a responsive, consistent, and predictable manner. Delays due to transmission engagement and clutch torque capacity application will directly result in poor vehicle propulsion response.

Premature clutch torque capacity application can also lead to driveline torque oscillations and potential engine stall while restarting. In addition, poor vehicle performance will be sensed by the driver if the transmission engagement feel is too harsh during or after the engine restart. Temperature and other environmental conditions may further amplify these issues.

A powertrain control system for a micro-HEV powertrain must also provide an immediate response to a request for vehicle propulsion when the engine is restarted after the gear shift lever was moved from the Drive position to the Reverse position, or from Reverse to Drive during the time while the engine was off.

For example, during an engine stop event while the gear shifter is in Drive and the brake pedal is depressed, the driver can move the shifter into Reverse while continuing to depress the brake pedal, thereby keeping the engine off while the vehicle is stopped. Given this condition, if the transmission is not engaged into reverse gear while the engine is off and the vehicle is stopped at the time the driver moves the gear shifter to Reverse position, there will be an excessive delay in vehicle propulsion once the driver releases the brake and the engine is started. The excessive vehicle propulsion delay is due to delaying the transmission engagement into reverse gear until the engine is started. In DCT applications in which the first and reverse gears are applied on the same shaft (e.g. odd shaft), if the transmission is engaged into reverse at the time of the engine start rather than at the time that the gear shifter was selected to Reverse, the gearbox shift synchronizers within the DCT must be disengaged from first gear, engaged into reverse gear, and then the clutch must be filled and stroked before any clutch torque can be applied. In DCT applications in which the first and reverse gears are applied on different shafts (e.g. $1^{st}$ gear on odd, reverse on even), the gearbox shift synchronizer must be engaged into reverse gear and then the clutch must be filled and stroked before applying any clutch torque.

Since vehicle propulsion cannot be provided until the clutch torque is applied, the delays in gearbox engagement and clutch actuation directly result in wheel torque delays and poor vehicle propulsion response.

A powertrain control strategy is needed to avoid this problem in a micro-HEV with a dual-clutch transmission.

SUMMARY OF THE INVENTION

A method for controlling restart of an engine in a hybrid electric powertrain includes (a) moving a gear lever from a forward position to a reverse position or moving a gear lever from a reverse position to a forward position; (b) disengaging an offgoing clutch and an offgoing forward or reverse gear; (c) using electric power to drive an auxiliary pump whose output causes a transmission to engage a reverse or forward gear and to stroke, to zero torque capacity, an oncoming clutch that connects the engine and the reverse or forward gear; (d) initiating the restart; (e) discontinuing use of the auxiliary pump after the engine is started (idling), and (f) increasing the oncoming clutch torque capacity to connect the engine and reverse or forward gear following the engine start.

The invention contemplates also a hybrid electric powertrain that includes a gear selector; a transmission including an offgoing clutch, an oncoming clutch, first and second gears; brake and accelerator pedals; a source of electric power; an auxiliary pump driven from the source and connected to the transmission; a starter motor driven from the source and connected to the engine; and a controller configured to stop the engine, disengage the offgoing clutch and the first gear, actuate the the auxiliary pump, use output produced by the auxiliary pump to engage the second gear and stroke the oncoming clutch, and actuate the starter to start the engine.

The control strategy strokes the oncoming input clutch and engages the oncoming gear before the restart is initiated. Consequently, the control system provides a substantially immediate response to a request for vehicle propulsion when the engine is restarted after the gear shift lever was moved from the Drive position to the Reverse position, or from Reverse to Drive while the engine was off.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
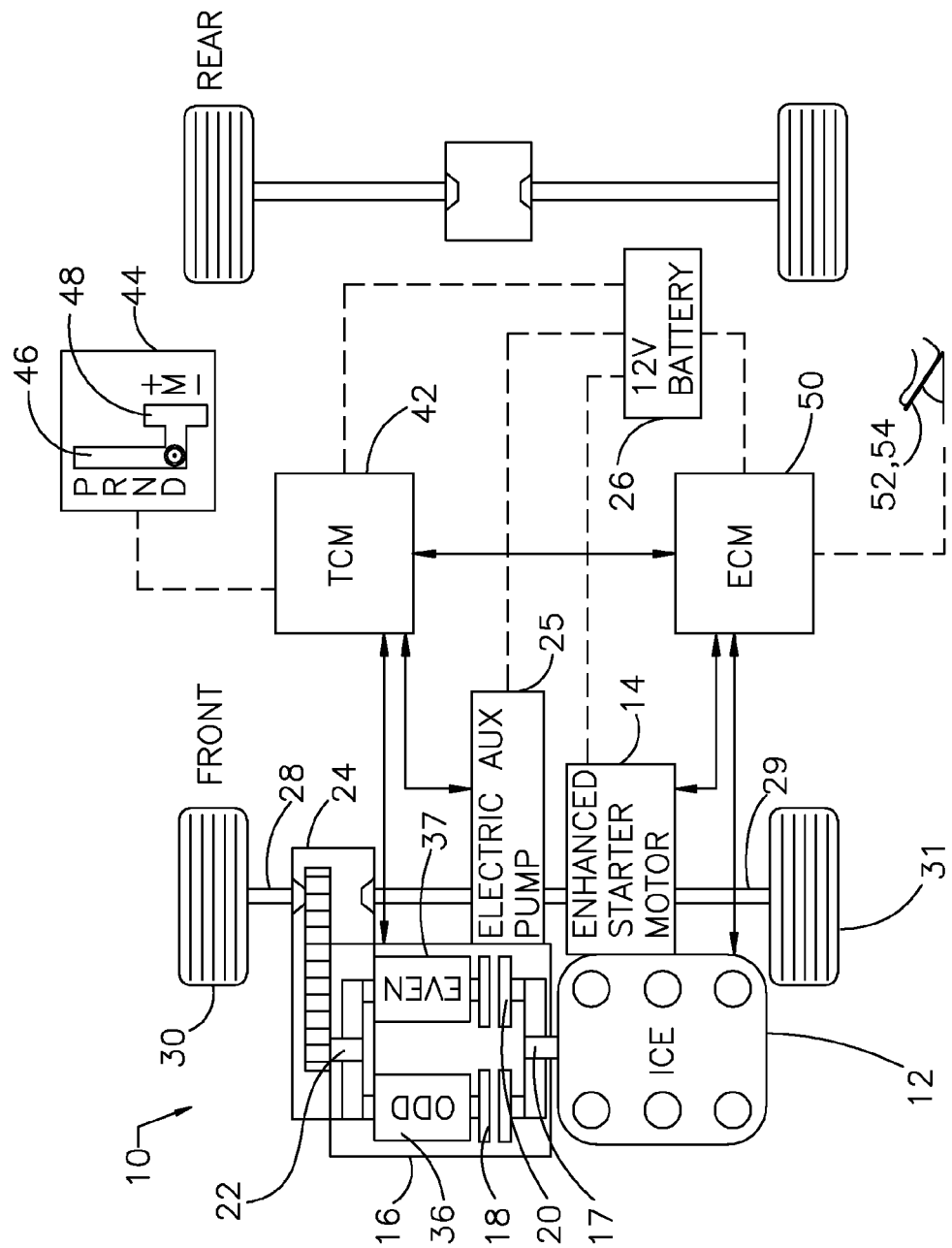
FIG. 1 is a schematic diagram of a micro-HEV powertrain.
Figure 2:
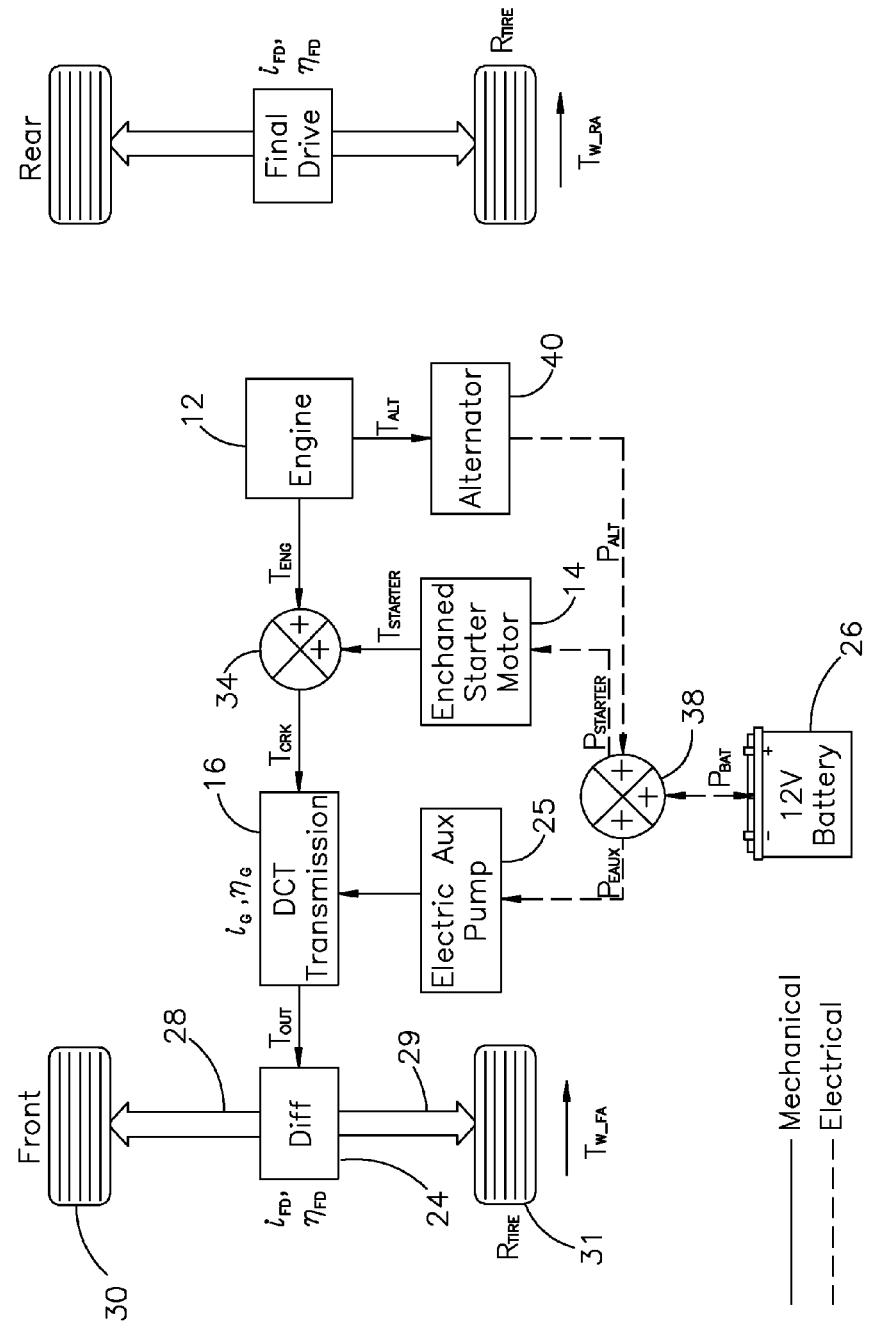
FIG. 2 is schematic diagram showing torque and electric power flow in the powertrain of FIG. 1.

Referring now to FIGS. 1 and 2, the micro-HEV powertrain 10 of FIG. 1 includes a power source 12, such as an internal combustion engine; an enhanced engine starter motor 14; a dual clutch automatic transmission 16, connected by an input shaft 17 and clutches 18, 20 to the engine;a shaft 36 containing odd gears $1^{st}, 3^{rd}, 5^{th}$ and reverse gears; a shaft 37 containing even gears $2^{nd}, 4^{th}$, and $6^{th}$ gears; a transmission output 22; final drive mechanism 24, connected to the output 22; an electric auxiliary hydraulic pump (EAUX) 25, whose output pressurizes the hydraulic system of the transmission 16; an electric storage battery 26, which supplies electric power to the pump 25 and starter 14; and axle shafts 28, 29, driveably connect to the driven wheels 30, 31.

FIG. 2 shows that engine output torque $T_{ENG}$ and torque $T_{STARTER}$ produced by the enhanced starter motor 14 are combined at a junction 34 to produce the engine crankshaft torque $T_{CRK}$. Transmission output torque $T_{OUT}$ is transmitted from the transmission 16 to the final drive and differential 24, which includes an interwheel differential mechanism. Electric power from battery 26 $P_{BAT}$ is supplied to a junction 38, from which electric power $P_{EAUX}$ is distributed to the EAUX 25 and starter power $P_{STARTER}$ is distributed to the starter 14. Electric power $P_{ALT}$ output by alternator 40 due to engine torque $T_{ALT}$ is delivered to junction 38.

A transmission control module (TCM) 42 is powered by battery 26 and receives and sends signals to the EAUX pump 25 and transmission 16 and receives input signals from a gear shifter 44, which moves among (P)ARK, (R)EVERSE, (N)EUTRAL, (D)RIVE positions in an automatic mode channel 46 and between upshift (+) and downshift (−) positions in a manual mode channel 48. An engine control module (ECM) 50 is powered by battery 26, receives and sends signals to the starter 14 and engine 12 and receives input signals from an accelerator and brake pedals 52, 54.

The example described next involves movement of the gear shifter 44 from the (D)RIVE position to the (R)EVERSE position while the engine 12 is shutdown and before an engine restart request is made. Rather than waiting until an engine restart request occurs to shift the transmission into reverse gear, the transmission 16 is shifted into reverse gear when the gear shifter 44 is moved manually by the vehicle operator from the D position to the R position while the engine is shutdown. Hydraulic line pressure produced by the electric auxiliary pump (EAUX) 25 while the engine is shutdown actuates the synchronizers that disengage a forward gear and engage a reverse gear. Furthermore, while the engine is shutdown and once the gearbox is shifted into the desired reverse gear, the input clutch 18 or 20 associated with transmitting power from the engine 12 to the reverse gear path in the transmission is immediately filled with hydraulic fluid and stroked thus preparing the transmission for responsive torque transmission once the engine restart request is initiated. Stroking the clutch 18, 20 takes up clearances between the clutch piston and the pack of clutch plates and clearance among the clutch plates so that torque capacity can immediately increased when commanded by the TCM 42 without any additional delays.

Figure 3A:
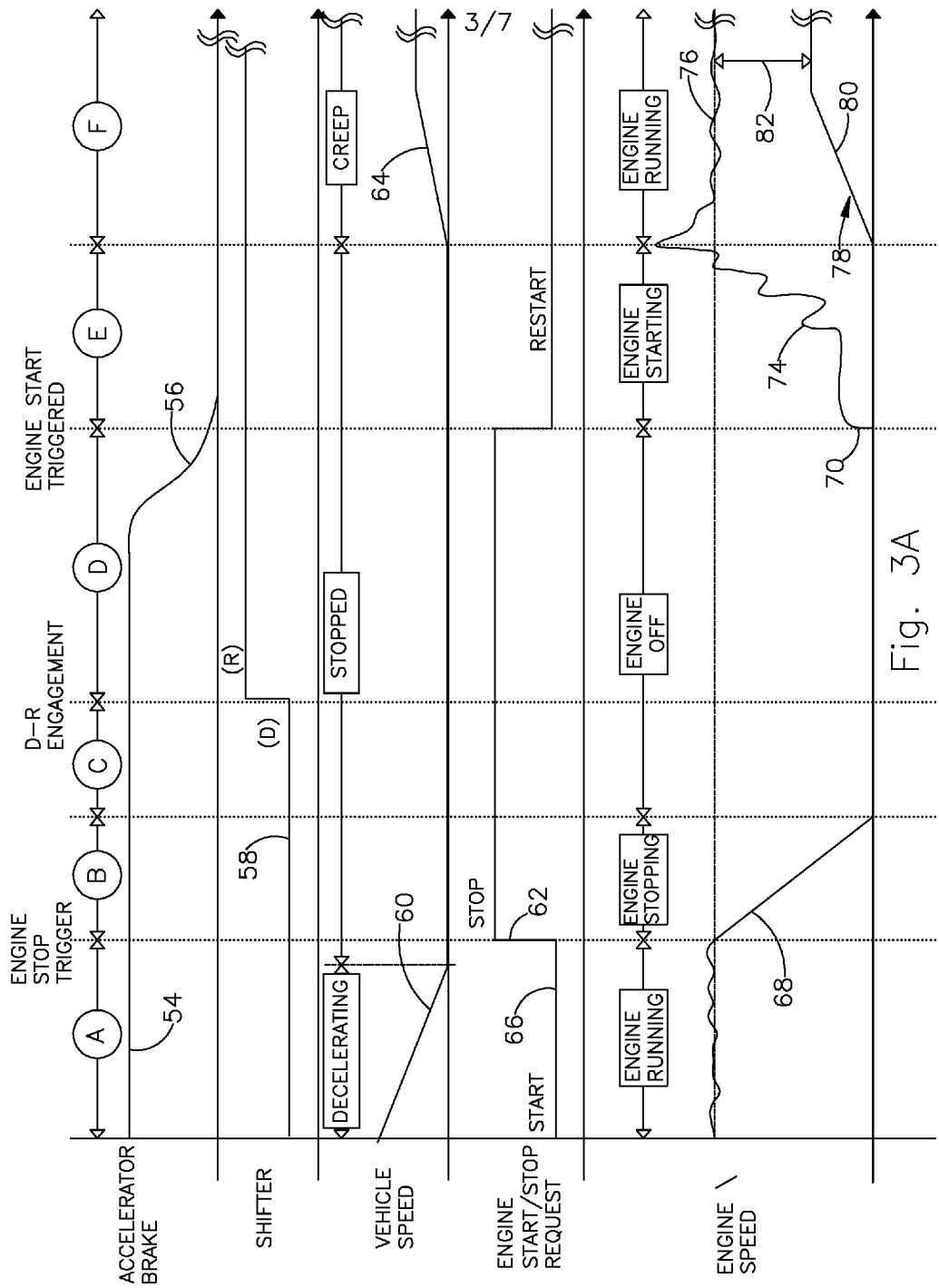
FIG. 3 are graphs that illustrate the change of certain powertrain variables during a Drive-Reverse shifter engagement and the control of an engine restart.
Figure 3B:
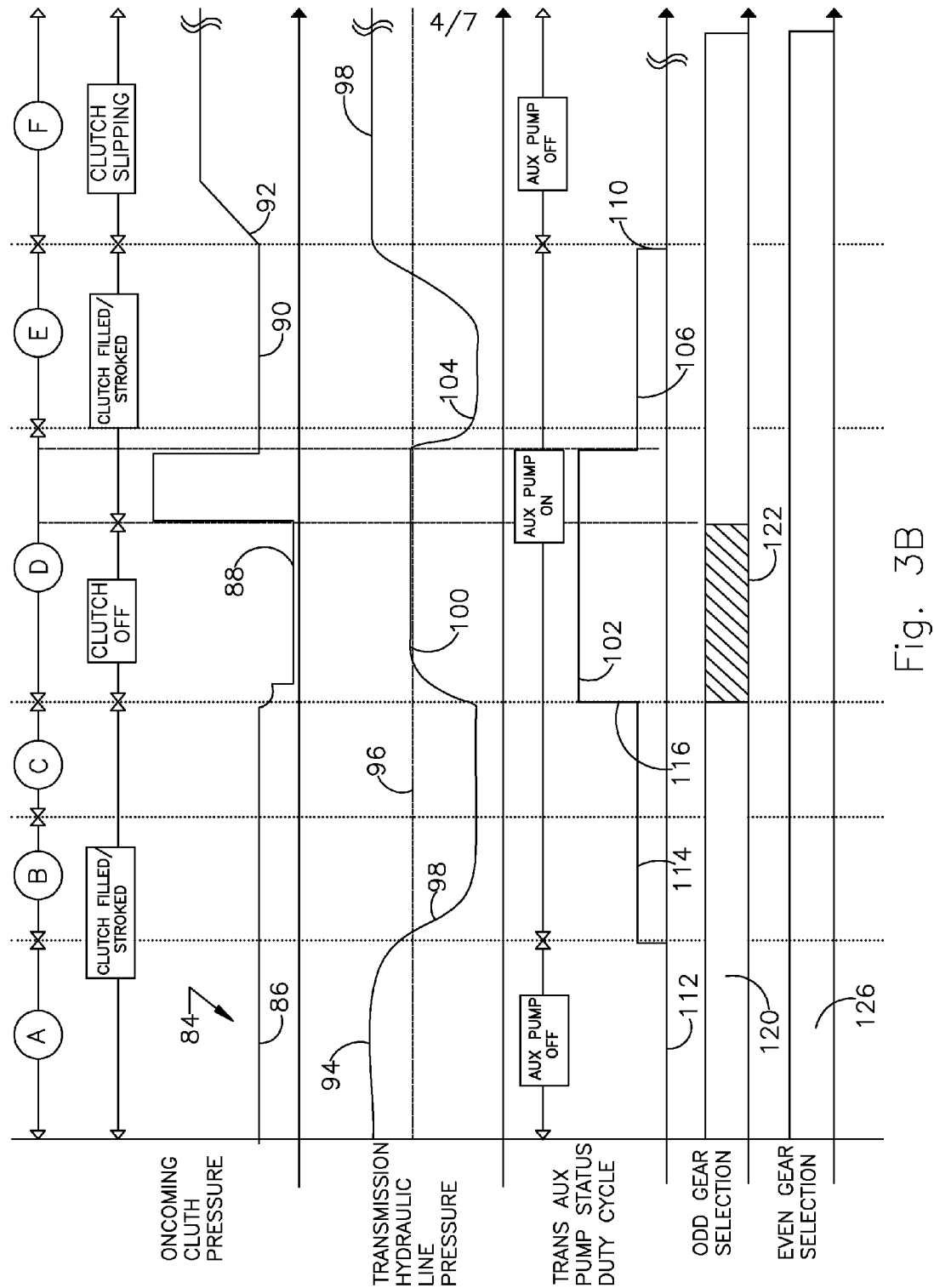

FIG. 3 contains graphs showing the change of certain powertrain variables during a Drive-Reverse shifter engagement while the engine is shutdown followed by an engine restart initiated by the vehicle operator.

Graph 54 represents the application of the brake pedal 52 and its release at 56, which initiates vehicle creep in reverse gear. Graph 58 represents the change of position of the gear shift lever 44 from its D to R positions while engine 12 is off. Graph 60, which represents vehicle speed, shows vehicle deceleration before the engine is stopped at 62, and vehicle creep 64 as the input clutch torque capacity increases following the engine restart. Graph 66 represents start, stopped and restarted requested states of engine 12.

Graph 68, which represents engine speed, shows a decrease from idle to zero speed as the engine is stopped at 62 and an increase in engine speed beginning at the engine restart 70 when the starter 14 cranks the engine. Engine speed continues to increase to the first engine combustion 74 and remains relatively steady during the period 76 while engine combustion is sustained and the engine idles.

Graph 78 represents the speed of transmission input 17 and the speed of the oncoming input clutch 18, 20 that is associated with reverse gear. Oncoming clutch speed increase during a period 80 occurs as the clutch gains torque capacity and remains steady thereafter. Slip across the input clutch is shown at 82.

Graph 84 represents pressure in the oncoming input clutch 18, 20. The oncoming clutch pressure is low during a period 86 while the clutch is stroked and clutch torque capacity is zero and the transmission is engaged in first gear. The clutch is destroked at 88 and remains at zero pressure while the transmission gearbox is disengaged from $1^{st}$ and engaging into reverse gear. Oncoming clutch pressure, thereafter, increases to fill the clutch and falls to low pressure during a period 90 while the clutch is being stroked and clutch torque capacity is zero during the engine restart at 70 and 74. Oncoming clutch pressure increases during a period 92 while clutch torque capacity increases to produce vehicle creep 64 in reverse gear.

Graph 94 represents transmission hydraulic line pressure, 96 represents the maximum pressure produced by the electric auxiliary pump 25. Transmission line pressure 94 decreases during period 98 to a level only provided by the electric auxiliary pump sufficient to keep the clutch stroked while the engine is stopped. Transmission line pressure increases to maximum electric auxiliary pump pressure 96 during period 100 when the pump duty cycle reaches >90 percent at 102, thereby actuating the transmission to engage into reverse gear and the oncoming clutch to be filled. Transmission line pressure 94 falls to 104 when the duty cycle of pump 25 reaches 20 percent at 106, thereby stroking the oncoming clutch. Then transmission line pressure 94 increases to a constant magnitude 98 produced by a mechanical pump located in the transmission 16 and driven by the engine 12 upon its restarting. At 110, following the restart and sustained engine combustion, the electric auxiliary (EAUX) pump 25 is turned off.

Graph 112 represents the ON-OFF status and PWM (pulse-width modulated) control duty cycle of the electrix auxiliary (EAUX) pump 25, which produces a low magnitude of pressure during period 114 when the percent duty cycle is at 20 percent while engine 12 is off and the clutch is stroked. At 116, pressure produced by the pump 25 increases in response to increasing the electric auxiliary pump duty cycle greater than 90 percent, thereby allow the transmission to engage into reverse gear and fill the oncoming clutch while the engine is off.

Graph 120 shows that transmission 16 shifts from first gear to reverse gear on the odd shaft 36 during the period 122 in response to the gear shift lever 44 being moved from the D position to the R position while the engine is off. Graph 126 shows that the shaft 37 containing the even numbered gears are not affected by D-R movement of the shift lever 44 and the engine restart control strategy for this dual-clutch transmission example.

Figure 4A:
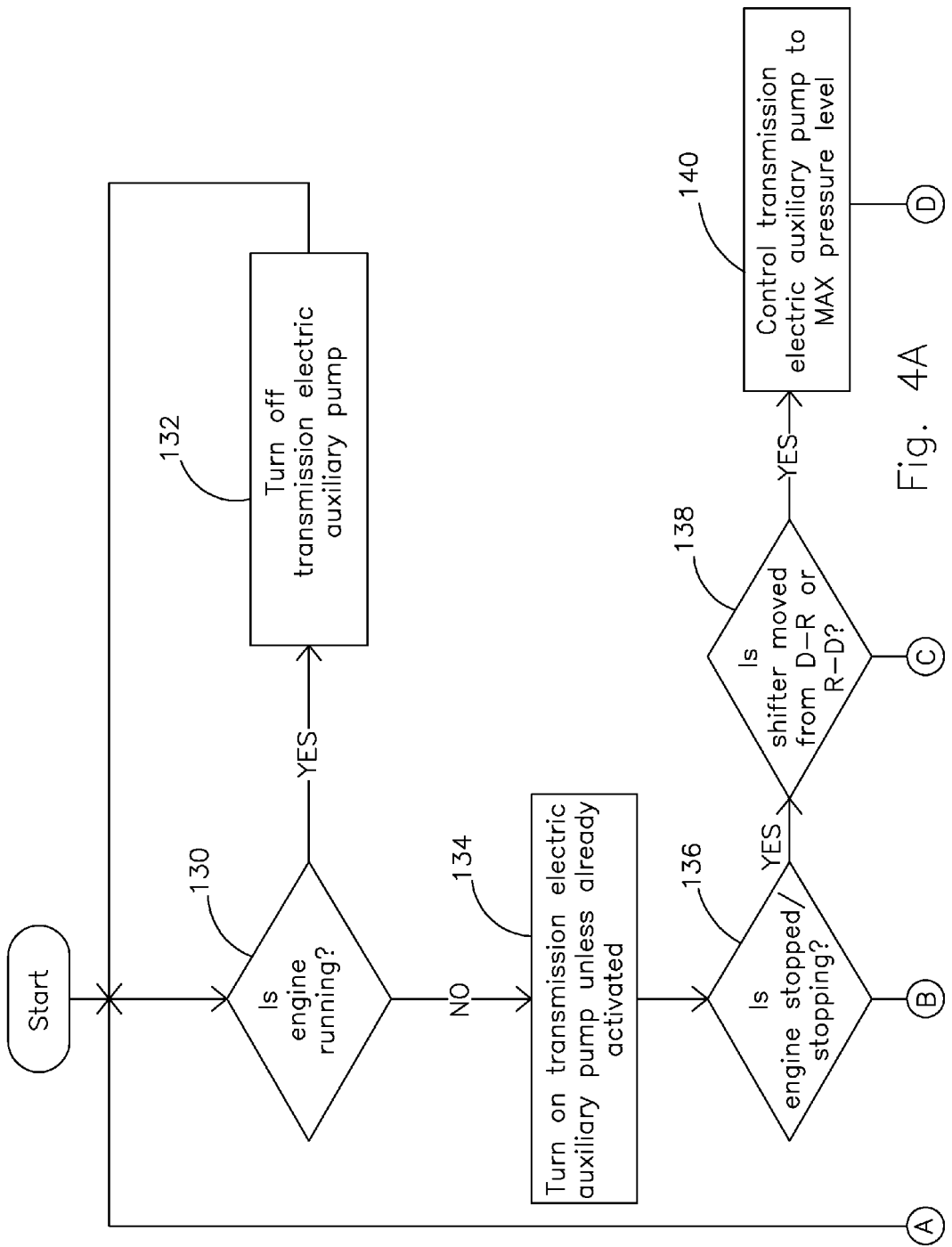
FIG. 4 illustrates a logic flow diagram of the steps of an algorithm for controlling the engine restart.
Figure 4B:
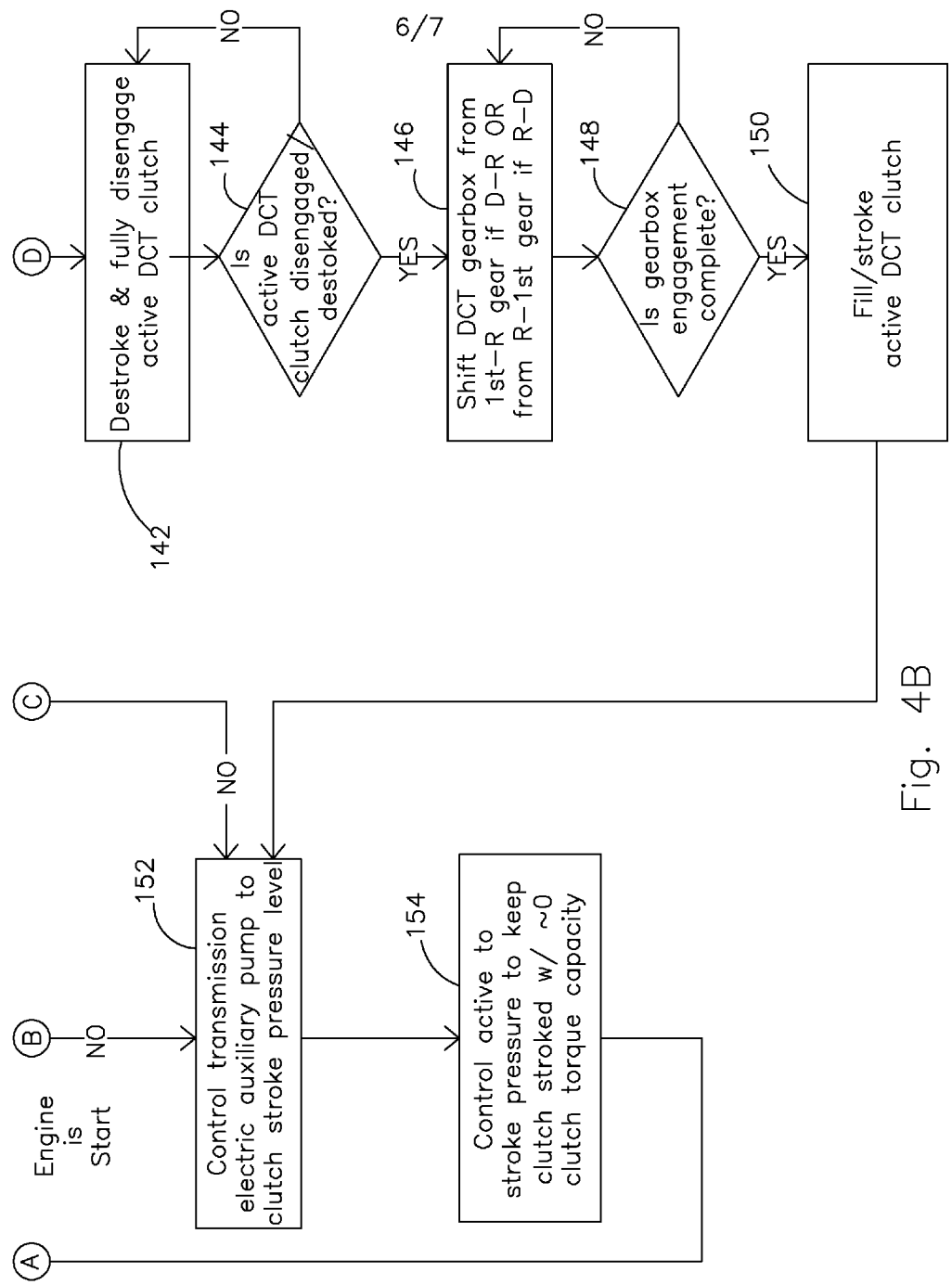

FIG. 4 illustrates a logic flow diagram of the steps of an algorithm for controlling the dual clutch transmission engagement and electric auxiliary pump before, during, and after an engine restart. At step 130 a test is made to determine whether the engine 12 is running. If the result of test 130 is logically true, at step 132 the EAUX pump 25 is turned off and control returns to step 130. If the result of test 130 is logically false, at step 134 the EAUX pump 25 is turned on if it has not already been turned on.

At step 136 a test is made to determine whether the engine is stopped or stopping. If the result of test 136 is true, at step 138 a test is made to determine whether the gear shift lever 44 is moved from D to R position or from R to D position. If the result of test 138 is true, at step 140 the percent duty cycle of the EAUX pump 25 is increased to its maximum duty cycle so that the maximum pressure produced by the pump is provided.

At step 142, the oncoming input clutch 18, 20 is destroked and fully disengaged.

At step 144 a test is made to determine whether the oncoming input clutch 18, 20 is destroked and fully disengaged. If the result of test 144 is false, control returns to step 142.

If the result of test 144 is true, at step 146 the transmission shifts from first gear to reverse gear, provided the gear selector lever 44 has been moved from the D position to the R position. Alternatively, at step 146 the transmission shifts from reverse gear to first gear, provided the gear selector lever 44 has been moved from the R position to the D position.

At step 148 a test is made to determine whether the transmission gear change commanded at step 146 has been completed. If the result of test 148 is false, control returns to step 146. If the result of test 148 is true, control continues to step 150.

At step 150 the oncoming input clutch 18, 20 is filled and stroked.

If the result of test 136 is false, or the result of test 138 is false, or upon executing step 150, at step 152 the transmission electric auxiliary pump 25 pressure is controlled to a level used to stroke the oncoming input clutch 18, 20.

Following step 152, at step 154 stroke pressure is maintained in the oncoming input clutch 18, 20 and its torque capacity is maintained at substantially zero.

Although the control strategy is described with respect to a D-R or R-D shift of the gear selector 44, the strategy can be applied to any gear shifter engagement request, i.e., movement of the shifter 44 between any of its positions including, but not limited to, D-R, R-D, R-L, L-R, while the engine is shutdown. For example, the same steps can be applied for R-D movement of the shift lever 44 while the engine is shutdown, in which case the transmission would be shifted into first gear from reverse gear.

Figure 5:
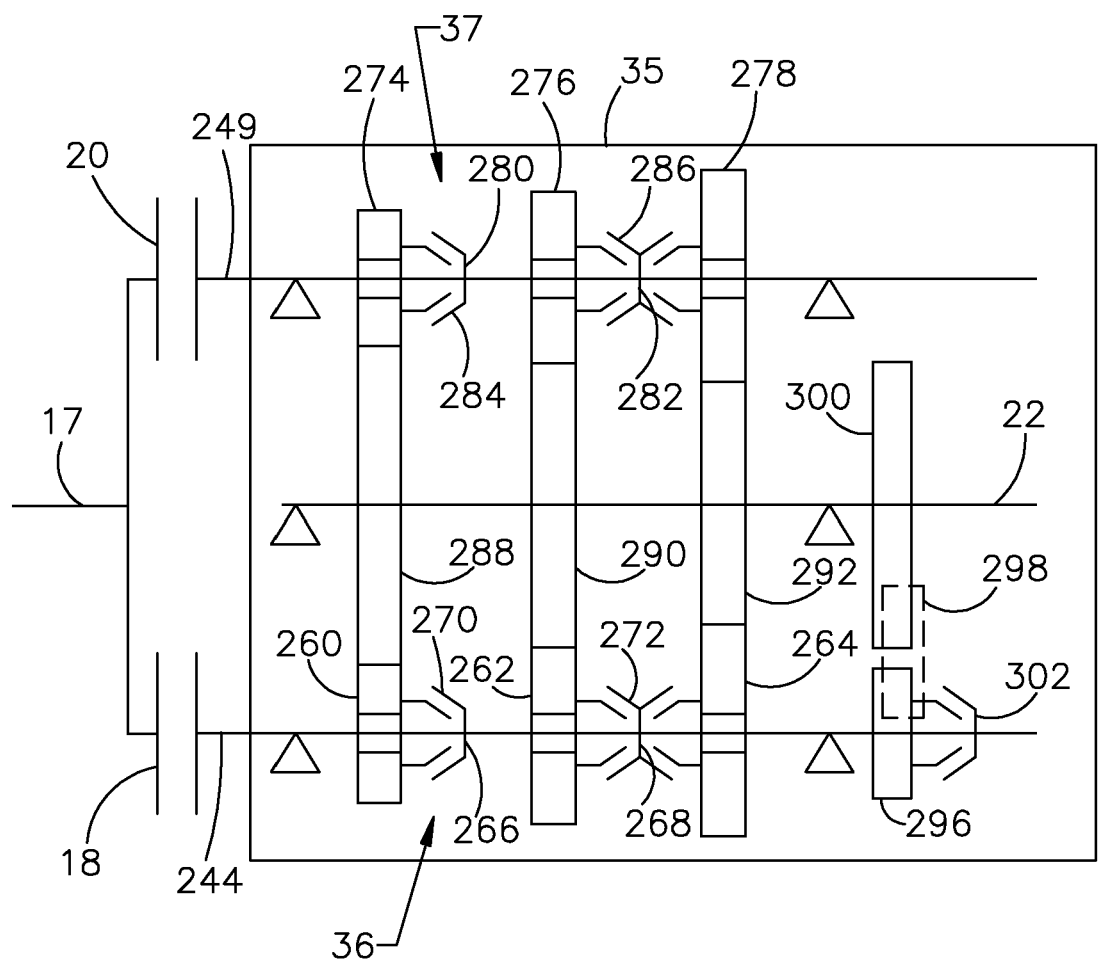
FIG. 5 is a schematic diagram showing kinematic details of a dual input clutch powershift transmission.

FIG. 5 illustrates details of a dual input clutch, powershift transmission 16 that includes the first input clutch 18, which selective connects the input 17 of the transmission alternately to the odd-numbered forward gears 36 and reverse gear 298 associated with a first layshaft 244, and a second input clutch 20, which selective connects the input 17 alternately to the even-numbered gears 37 associated with a second layshaft 249.

Layshaft 244 supports pinions 260, 262, 264, which are each journalled on shaft 244, and couplers 266, 268, 302 which are secured to shaft 244. Pinions 260, 262, 264 are associated respectively with the first, third and fifth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the second, fourth and sixth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 22 supports gears 288, 290, 292, which are each secured to output shaft 24. Gear 288 meshes with pinions 260 and 274. Gear 290 meshes with pinions 262 and 276. Gear 292 meshes with pinions 264 and 278.

A reverse pinion 296, journalled on layshaft 244, meshes with an idler 298, which meshes with a reverse gear 300 secured to output shaft 22. A coupler 302 selectively connects reverse pinion 296 to layshaft 244.

Couplers 266, 268, 280, 282 and 302 may be synchronizers, or dog clutches or a combination of these.

During an engine restart following D-R movement of gear selector 44, clutch 18 is initially the offgoing clutch as first gear is disengaged and is also the oncoming clutch after reverse gear has been engaged since both first and reverse gears can be drivably connected on the same layshaft 244. During an engine restart following R-D movement of gear selector 44, clutch 18 is initially the offgoing clutch as reverse gear is disengaged and is also the oncoming clutch after first gear has been engaged since both first and reverse gears can be drivably connected on the same layshaft 244.

In accordance with the provisions of the patent statutes, the preferred embodiment has been described. However, it should be noted that the alternate embodiments can be practiced otherwise than as specifically illustrated and described.

The invention claimed is:

1. A method for controlling transmission engagement during restart of an engine in a hybrid electric powertrain, comprising the steps of:
(a) stopping the engine;

(b) using electric power to drive an auxiliary pump whose output causes a dual input clutch transmission to engage a gear that corresponds to the lever position, and to stroke, to zero torque capacity, an oncoming input clutch corresponding to said gear of a transmission;
(c) initiating the engine restart; and
(d) discontinuing use of the auxiliary pump.

2. The method of claim 1 further comprising:
using the transmission to increase the torque capacity of the oncoming clutch to a requested torque capacity.

3. The method of claim 1 wherein step (c) further comprises one of releasing a brake pedal and depressing an accelerator pedal to initiate the restart.

4. The method of claim 1 further comprising:
stopping the vehicle by applying wheel brakes in response to depressing a brake pedal; and
releasing an accelerator pedal.

5. The method of claim 1 further comprising:
disengaging an offgoing clutch and disengaging an offgoing gear before executing step (b).

6. The method of claim 1 further comprising:
moving the gear lever from a forward position to a reverse position;
disengaging an offgoing clutch; and
disengaging a forward gear.

7. The method of claim 1 further comprising:
moving the gear lever from the reverse position to the forward position;
disengaging an offgoing clutch; and
disengaging a reverse gear.

8. A method for controlling transmission engagement during restart of an engine in a hybrid electric powertrain, comprising the steps of:
(a) stopping the engine;
(b) disengaging an offgoing clutch and an offgoing forward gear of a transmission having dual input clutches;
(c) using electric power to drive an auxiliary pump whose output causes the transmission to engage a reverse gear and to stroke, to zero torque capacity, an oncoming input clutch that connects the engine and the reverse gear;
(d) initiating the restart; and
(e) discontinuing use of the auxiliary pump.

9. The method of claim 8 further comprising:
using the transmission to increase the torque capacity of the oncoming clutch to a requested torque capacity after the engine has restarted.

10. The method of claim 8 wherein step (d) further comprises one of releasing a brake pedal and depressing an accelerator pedal to initiate the restart.

11. The method of claim 8 further comprising:
stopping the vehicle in response to depressing a brake pedal, and releasing an accelerator pedal.

12. A method for controlling restart of an engine in a hybrid electric powertrain, comprising the steps of:
(a) stopping the engine;
(b) disengaging an offgoing clutch and a reverse gear of a transmission having dual input clutches;
(c) using electric power to drive an auxiliary pump whose output causes a transmission to engage a forward gear and to stroke, to zero torque capacity, an oncoming clutch that connects the engine and the forward gear;
(d) initiating the restart; and
(e) discontinuing use of the auxiliary pump.

13. The method of claim 12 further comprising:
using the transmission to increase the torque capacity of the oncoming clutch to a requested torque capacity after the engine has restarted.

14. The method of claim 12 wherein step (d) further comprises one of releasing a brake pedal and depressing an accelerator pedal to initiate the restart.

15. The method of claim 12 further comprising:
stopping the vehicle in response to depressing a brake pedal, and releasing an accelerator pedal.

16. A hybrid electric powertrain, comprising:
an engine;
a gear selector moveable between selectable positions;
a transmission including an offgoing input clutch, an oncoming input clutch, and first and second gears;
a brake pedal;
a source of electric power;
an auxiliary pump driven from the source and connected to the transmission;
a starter motor driven from the source and connected to the engine; and
a controller configured to stop the engine, disengage the offgoing clutch and the first gear, actuate the source to drive the pump, use output produced by the pump to engage the second gear and stroke the oncoming clutch, actuate the starter to start the engine, and increase a torque capacity of the oncoming clutch after said engine has started.

17. The powertrain of claim 16 wherein the controller is further configured to using the transmission to increase the torque capacity of the oncoming clutch to a requested torque capacity.

18. The powertrain of claim 16 wherein the controller is further configured to restart the engine in response to a release of the brake pedal.

19. The powertrain of claim 16 further comprising:
an accelerator pedal; and
wherein the controller is further configured to restart the engine in response to depressing the accelerator pedal.

20. The powertrain of claim 16 wherein the first gear is a forward gear and the second gear is a reverse gear.

21. The powertrain of claim 16 wherein the first gear is a reverse gear and the second gear is a forward gear.

* * * * *